US011912311B2

(12) United States Patent
Choi et al.

(10) Patent No.: US 11,912,311 B2
(45) Date of Patent: Feb. 27, 2024

(54) SYSTEM AND METHOD OF DETECTING AND MITIGATING ERRATIC ON-ROAD VEHICLES

(71) Applicant: GM Global Technology Operations LLC, Detroit, MI (US)

(72) Inventors: Gabriel Tayoung Choi, Novi, MI (US); Paul A. Adam, Milford, MI (US); Namal P. Kumara, Ypsilanti, MI (US); Christopher Michael Churay, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 296 days.

(21) Appl. No.: 17/398,597

(22) Filed: Aug. 10, 2021

(65) Prior Publication Data

US 2023/0052137 A1     Feb. 16, 2023

(51) Int. Cl.
*B60W 30/09*     (2012.01)
*B60W 30/18*     (2012.01)
(Continued)

(52) U.S. Cl.
CPC ...... *B60W 60/00274* (2020.02); *B60W 30/09* (2013.01); *B60W 30/18163* (2013.01); *B60W 50/14* (2013.01); *B60W 2520/10* (2013.01); *B60W 2554/4041* (2020.02); *B60W 2554/4042* (2020.02); *B60W 2554/4046* (2020.02); *B60W 2555/60* (2020.02); *B60W 2720/10* (2013.01);
(Continued)

(58) Field of Classification Search
CPC ........... B60W 60/00274; B60W 30/09; B60W 30/18163; B60W 50/14; B60W 2520/10; B60W 2554/4041; B60W 2554/4042; B60W 2554/4046; B60W 2555/60; B60W 2720/10; B60W 2754/20; B60W 2754/30
See application file for complete search history.

(56) References Cited

U.S. PATENT DOCUMENTS 8,731,742 B2     5/2014  Zagorski et al.
11,433,922 B1 *  9/2022  Van Heukelom .... G05D 1/0221
(Continued)

OTHER PUBLICATIONS

United States Patent and Trademark Office. U.S. Appl. No. 17/068,065, filed Oct. 12, 2020.

*Primary Examiner* — Peter D Nolan
*Assistant Examiner* — Ashley L Redhead, Jr.
(74) *Attorney, Agent, or Firm* — Vivacqua Crane, PLLC (57) ABSTRACT

A system and method of detecting and mitigating an erratic vehicle by a host vehicle. The method includes gathering sensor information on a calibratable external region surrounding the host vehicle; analyzing the sensor information to detect a target vehicle traveling in a lane and a movement of the target vehicle in the lane; determining whether the movement of the target vehicle in the lane is erratic; if erratic then designating target vehicle as erratic vehicle; assigning a risk score to the erratic vehicle; and implementing a predetermined mitigating action correlating to the assigned risk score to the erratic vehicle. The mitigating action includes one or more of: warning an operator of the host vehicle, warning a vehicle proximal to the host vehicle, and taking at least partial control of the host vehicle to further distance the host vehicle apart from the erratic vehicle.

15 Claims, 3 Drawing Sheets

(51) Int. Cl.
*B60W 50/14* (2020.01)
*B60W 60/00* (2020.01)

(52) U.S. Cl.
CPC ..... *B60W 2754/20* (2020.02); *B60W 2754/30* (2020.02)

(56) References Cited

U.S. PATENT DOCUMENTS

| | | | | |
|---|---|---|---|---|
| 11,682,272 | B2* | 6/2023 | Avadhanam | G06N 3/045 |
| | | | | 340/944 |
| 11,697,417 | B2* | 7/2023 | Clarke | B60W 30/14 |
| | | | | 701/28 |
| 2021/0237779 | A1* | 8/2021 | Das | G08G 1/167 |
| 2021/0354726 | A1* | 11/2021 | Bill | B60W 40/09 |
| 2021/0403008 | A1* | 12/2021 | Grossman | G06T 7/246 |
| 2022/0024461 | A1* | 1/2022 | Takei | G08G 1/0145 |
| 2022/0084397 | A1* | 3/2022 | Tanaka | B60W 30/18163 |
| 2022/0188624 | A1* | 6/2022 | Kuehnle | G06N 3/08 |
| 2022/0188667 | A1* | 6/2022 | Burisch | G08G 1/166 |
| 2022/0227367 | A1* | 7/2022 | Kario | B60W 30/0956 |
| 2022/0340137 | A1* | 10/2022 | Ollis | G05D 1/0088 |
| 2022/0363292 | A1* | 11/2022 | Yang | B60W 30/162 |
| 2022/0383421 | A1* | 12/2022 | Grivel | G06Q 40/08 |
| 2022/0397402 | A1* | 12/2022 | Bolless | B60W 40/06 |
| 2023/0052137 | A1* | 2/2023 | Choi | B60W 50/14 |
| 2023/0089978 | A1* | 3/2023 | Pulver | G05D 1/0221 |
| 2023/0096248 | A1* | 3/2023 | Komori | B60R 21/0134 |
| | | | | 701/45 |
| 2023/0115708 | A1* | 4/2023 | Xiang | G09B 29/00 |
| | | | | 701/23 |
| 2023/0116198 | A1* | 4/2023 | Krüger | B60W 40/08 |
| | | | | 340/438 |
| 2023/0124314 | A1* | 4/2023 | Foster | B60W 30/18163 |
| | | | | 701/26 |
| 2023/0150516 | A1* | 5/2023 | Kawamura | B60W 40/10 |
| | | | | 701/31.4 |
| 2023/0159029 | A1* | 5/2023 | Tseng | B60W 30/14 |
| | | | | 701/93 |
| 2023/0166743 | A1* | 6/2023 | Heck | B60W 50/0097 |
| | | | | 701/26 |
| 2023/0219585 | A1* | 7/2023 | Eiras | B60W 60/0015 |
| | | | | 701/25 |

* cited by examiner

SYSTEM AND METHOD OF DETECTING AND MITIGATING ERRATIC ON-ROAD VEHICLES

INTRODUCTION

The present disclosure relates to situational awareness for on-road vehicles, more particularly to a system and a method of detecting and mitigating erratic on-road vehicles.

Modern on-road vehicles are equipped with external sensors that monitor a region surrounding a host vehicle for improving the host vehicle operator's situational awareness. Examples of external sensors include, but are not limited to, vision sensors, radar sensors, and Light Detection and Ranging (LiDaR) sensors. Such external sensors may be part of the vehicle's active safety systems, such as a forward collision alert system, a collision imminent braking system, a collision preparation system, and/or an enhanced collision avoidance system.

External sensors are also relied upon by vehicles equipped with Advance Driver Assistance Systems (ADAS). ADAS are used to enhance or automate selective motor vehicle systems in order to increase the vehicle operator's driving performance or increase the level of autonomous driving. ADAS typically include an ADAS controller, also referred to as an ADAS module, that is in communication with the vehicle external sensors, vehicle state sensors, and selective vehicle control systems such as steering, acceleration, and braking systems. The ADAS module analyzes information gathered by the external sensors and vehicle state sensors to generate and provide instructions to the vehicle control systems for partial or full autonomous control of the vehicle.

Thus, while modern on-road vehicles' active safety systems and ADAS achieve their intended purpose, there is a continual need to increase vehicle occupant safety by monitoring the behavior of target vehicles proximal to a host vehicle to determine if one or more of the target vehicles are behaving in an erratic manner that may pose a risk to the host vehicle and to take mitigating actions to avoid such erratic target vehicles.

SUMMARY

According to several aspects, a method of detecting and mitigating an erratic vehicle by a host vehicle is disclosed. The method includes the steps of, gathering external sensor information on an external region surrounding the host vehicle; analyzing the external sensor information to detect a target vehicle traveling in a lane and a movement of the target vehicle in the lane within the external region; determining whether the movement of the target vehicle in the lane is erratic; assigning a risk score to the target vehicle when the movement of the target vehicle in the lane is determined to be erratic; and implementing a predetermined mitigating action correlating to the assigned risk score to the target vehicle. The mitigating action may include one or more of: warning an operator of the host vehicle, warning a vehicle proximal to the host vehicle, and taking at least partial control of the host vehicle to further distance the host vehicle apart from the target vehicle.

In an additional aspect of the present disclosure, the method further includes determining whether the target vehicle is in the same lane as the host vehicle and whether target vehicle is front of or in rear of the host vehicle and taking partial control of the host vehicle to further distance the host vehicle apart from the target vehicle when the target vehicle is in the same lane and in front of the host vehicle. This includes determining a current speed of the host vehicle and the maximum posted speed limit; calculating an overtaking speed to pass the target vehicle; and initiating one of: (i) a lane change overtaking routine when the sum of the current speed of the host vehicle and the calculated safe overtaking speed is less than the maximum posted speed limit, (ii) a deceleration routine when the sum of the current speed of the host vehicle and the calculated safe overtaking speed is equal to or greater than the maximum posted speed limit; and (iii) a lane change routine to maneuver the host vehicle to another lane further from the target vehicle.

In another aspect of the present disclosure, the target vehicle is determined to be erratic when a Condition A is True and at least one of: Condition B, Condition C, and Condition D is True. Condition A=True when $[K_{thrsh0} >= ABS(\Delta X_{tgt}) >= K_{thrsh1}]$; the Condition B=True when $\{ABS(\Delta_{ytgt}) >= K_{thrsh2}$ AND $freq_{tgt,lane,cntr} >= K_{thrsh3}\}$; Condition C=True when $Std_{(vtgt-vlane,avg)} >= K_{thrsh4}$; and Condition D=True when $\Delta t_{tgt,btwn,LaneChange} <= K_{thrsh5}]$.

In another aspect of the present disclosure, the method further includes assigning a first risk score when Condition A and [Condition C or Condition D] are True; assigning a second risk score when Condition A and Condition B are True; assigning a third risk score when Condition A and [Condition C and Condition D] are true; assigning a fourth risk score when Condition A and [Condition B and Condition C] are True; and assigning a fifth risk score when Condition A and [Condition B, Condition C, and Condition D] are True. The risk of adverse reaction to the host vehicle increases as the risk scores increases from the first risk score to the fifth risk score. The predetermined mitigating action is consummate with the level of risk score, such that the first risk score includes a warning to an operator of the host vehicle and the third to fifth score includes a partial to a full autonomous mitigating action.

According to several aspects, an autonomous vehicle having an erratic vehicle detection and mitigation system is disclosed. The autonomous vehicle includes at least one external sensor configured to collect sensor information on an external region surrounding the autonomous vehicle; and a module configured to: analyzing the sensor information to detect a target vehicle in a lane, a movement of the target vehicle in the lane, and a relative position of the target vehicle with respect to the autonomous vehicle; determining the target vehicle is an erratic vehicle when the movement of the target vehicle includes at least one of: (i) oscillating about a centerline of the lane above a predetermine frequency, (ii) driving beyond a predetermined offset from the centerline of the lane for greater than a predetermined length of time, (iii) fluctuating in speed relative to the average speed above a predetermined standard variation, and (iv) changing lanes beyond a predetermined frequency; and implementing a mitigating action including one or more of: (i) warning an operator of the autonomous vehicle, and (ii) taking at least partial control of the autonomous vehicle to further distance the autonomous vehicle apart from the erratic vehicle.

In an additional aspect of the present disclosure, the module is further configured to implement a mitigating action when the autonomous vehicle is in the same lane behind the erratic vehicle, including: determining a current speed of the autonomous vehicle and the maximum posted speed limit; calculating an overtaking speed to pass the erratic vehicle; and initiating a lane change overtaking routine when the sum of the current speed of the autonomous vehicle and the calculated safe overtaking speed is less than the maximum posted speed limit.

According to several aspects, an erratic vehicle detection and mitigation (EVDAM) system is disclosed. The EVDAM system includes at least one external sensor configured to collect sensor information on a calibratable sensor region surrounding the host vehicle; and a module configured to process the sensor information from the at least one external sensor to detect: (i) an erratic vehicle within the calibratable sensor region surrounding the host vehicle and (ii) a position of the erratic vehicle relative to the host vehicle, and to implement a mitigating action including increasing the distance of the host vehicle form the erratic vehicle.

In an additional aspect of the present disclosure, the calibratable region surrounding the host vehicle is defined between an inner sensor range and an outer sensor range. The inner sensor range and the outer sensor range are calibrated with respect to the velocity of the host vehicle and detected environmental conditions, such that the confidence of information gathered by external sensor is above a predetermine confidence level and provides sufficient time for the module to process the external sensor information in order to detect and mitigate the erratic vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

Figure 1:
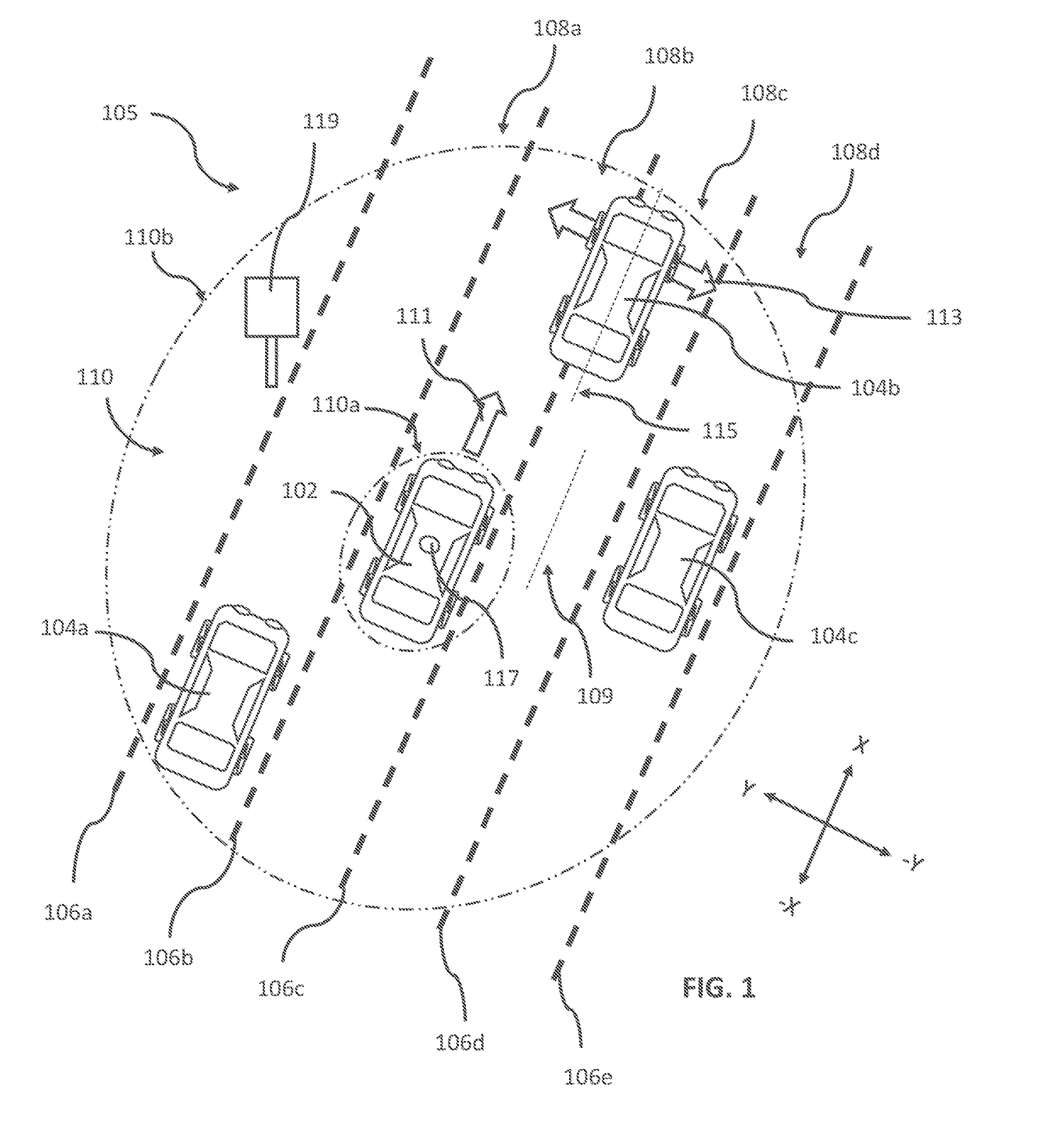
FIG. 1 is an illustration of a top view of a host vehicle having an Erratic Vehicle Detection and Mitigation (EVDAM) system traveling on a multi-lane roadway, according to an exemplary embodiment.

FIG. 1 shows an illustration of a top-view of a host vehicle 102 and a plurality of target vehicles 104a, 104b, 104c, 104d traveling on a multi-lane roadway 105. The host vehicle 102 is equipped with an Advance Driver Assistance System (ADAS) and an Erratic Vehicle Detection and Mitigation (EVDAM) system. The EVDAM system is configured to monitor the plurality of target vehicles 104a, 104b, 104c, 104d within a calibratable external sensor region 110 surrounding the host vehicle 102. The calibratable sensor region 110 is defined between an inner sensor range 110a and an outer sensor range 110b.

The plurality of target vehicles 104a, 104b, 104c, 104d are monitored by the EVDAM system to determine if one or more of the target vehicles 104a, 104b, 104c, 104d are driving in an erratic manner. When an erratic driving vehicle is detected, the EVDAM system alerts the operator of the host vehicle 102 and, if necessary, communicates and coordinates with the ADAS of the host vehicle to take mitigating actions to avoid or minimize potential risks that the erratic driving vehicle may pose.

The multi-lane roadway 105 is defined by a plurality of parallel lane markers 106a, 106b, 106c, 106d, 106e. A first lane 108a, a second lane 108b, a third lane 108c, and a fourth lane 108d are defined between pairs of respective adjacent lane markers 106a, 106b, 106c, 106d, 106e. Each of the lanes 108a, 108b, 108c, 108d includes a longitudinal centerline defined between a pair of respective parallel lane markers 106a, 106b, 106c, 106d, 106e. For brevity of illustration, only one centerline 109 is shown in lane 108c defined between lane markers 106c and 106d.

The host vehicle 102 is shown traveling in a forward direction 111 within the second lane 108b. The first target vehicle 104a is shown traveling in the forward direction 111 within the adjacent first lane 108a behind the host vehicle 102. The second target vehicle 104b is shown traveling in the forward direction 111 and oscillating in a lateral direction 113 in the third lane 108c and front of the host vehicle 102. The third target vehicle 104c is shown traveling in the forward direction 111 within the fourth lane 108d proximal to, but not immediately adjacent, the second lane 108b. Each of the first, second, and third target vehicles 104a, 104b, 104c includes a longitudinal vehicle centerline. For brevity of illustration, only a centerline 115 of target vehicle 104b is shown.

The ADAS of the host vehicle 102 may be configured to operate in a range of modes from a partial autonomous mode, requiring operator input, to a full autonomous mode requiring minimal to no operator input. For the purpose of this disclosure, partial autonomous mode and full autonomous mode will be referred to in the collective as "autonomous mode". The term "operator" describes a person responsible for directing the operation of the host vehicle 102, whether actively involved in controlling one or more vehicle functions or directing autonomous vehicle operation.

The host vehicle 102 includes a plurality of external sensors 117 configured to gather information for the operations of the ADAS and the EVDAM system. The EVDAM system receives information from the plurality of external sensors 117 and fuses the information to detect road markers, such as the lane markers 106a, 106b, 106c, 106d, 106e and objects, such as the target vehicles 104a, 104b, 104c traveling on the roadway 105 and road signs 119 within the calibratable sensor region 110 for detecting erratic driving vehicles.

The coverage of the calibratable sensor region 110 may be continually adjected based on the effective detection ranges of the external sensors 117, environmental conditions such as weather and road conditions, velocity of the host vehicle 104, and other factors such as the required reaction times of the operator and/or ADAS for identifying and mitigating potential risks. For example, when the host vehicle 102 is traveling at a higher velocity, a larger coverage of the sensor region 110 is required in order to provide the operator and/or ADAS sufficient response time to identify and mitigate the threat of an erratic vehicle. The EVDAM system may receive roadway speed limit data from information gathered from the external sensors 117, such as from road signs 119, from stored map data, and/or navigation data from the ADAS or other host vehicle systems.

The EVDAM system determines if a target vehicle 104a, 104b, 104c is driving erratically and poses a potential threat or risk to the host vehicle 102 by using statistics of relative lateral position in the y-axis, longitudinal speed in the x-axis, and lane change frequency of the target vehicle 104a, 104b, 104c. For example, when the EVDAM system determines that: (i) a target vehicle 104b is oscillating over the centerline 109 of the lane 108c above a predetermine frequency or the target vehicle 104b drives above a predetermined un-reasonably high offset from the centerline 109, (ii) the longitudinal speed of the target vehicle 104b is fluctuating relative to the average lane speed of the target vehicle 104b or the average lane speed of the other vehicles in the same lane, or (iii) if the target vehicle 104b changes lane between adjacent lanes 108b and 108c above a predetermined frequency, then the EVDAM will assign an "erratic vehicle" status to the target vehicle 104b.

When the EVDAM system assigns an "erratic vehicle" status to the target vehicle 104b, the EVDAM system coordinates with the ADAS to mitigate the potential risk from the erratic vehicle 104b based on the severity of the detected movements and position of the erratic vehicle 104b relative to the host vehicle 102. Such mitigating actions may include, but not limited to, warning the operator of the host vehicle 102 and surrounding target vehicles 104a, increasing a safe distance between the host vehicle 102 and the erratic vehicle 104b by slowing down the host vehicle 102, changing lanes, passing the erratic vehicle 104b, and/or other mitigation actions.

Figure 2:
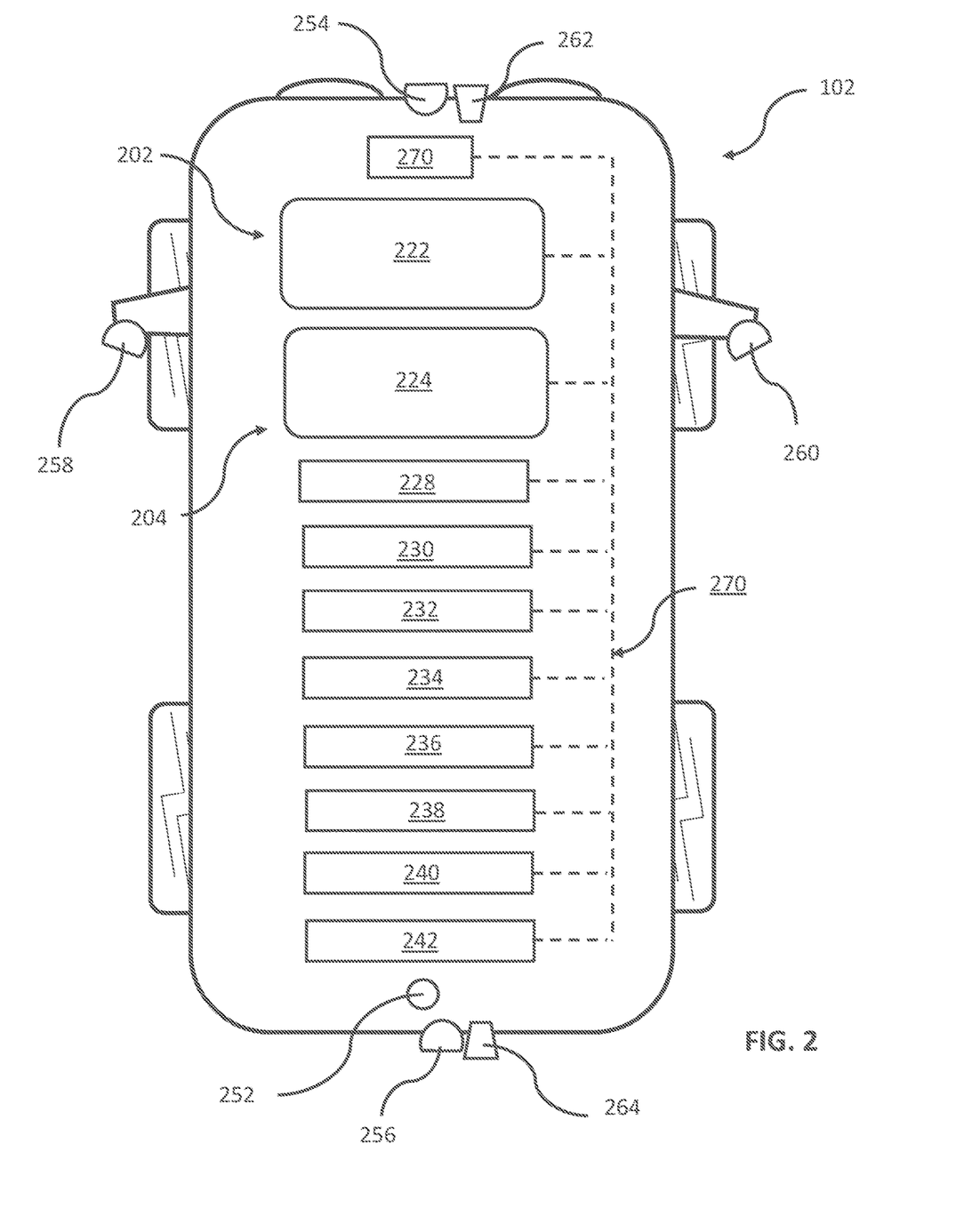
FIG. 2 is a functional diagram of an advance driver assisted system (ADAS) equipped host vehicle having the EVDAM system.

FIG. 2 shows a functional diagram of an exemplary host vehicle 102 equipped with an ADAS 202 and an EVDAM system 204. The ADAS 202 is configured to provide a level of driving automation from partial autonomous mode to full autonomous mode in accordance with levels 0-5 of SAE J3016 Levels of Driving Automation. Driving automation can include a range of dynamic driving and vehicle operation including some level of automatic control or intervention related to simultaneous automatic control of multiple vehicle functions, such as steering, acceleration, and braking, wherein the operator retains partial control of the vehicle. Driving automation can also include full automatic control of all vehicle driving functions, including steering, acceleration, braking, and executing maneuvers such as automated lane changes, wherein the driver cedes control of the vehicle for a period of time.

As used herein, module, controller, control module, control unit, electronic control unit, processor and similar terms mean any one or various combinations of one or more of Application Specific Integrated Circuit(s) (ASIC), electronic circuit(s), central processing unit(s) (preferably microprocessor(s)) and associated memory and storage (read only memory (ROM), random access memory (RAM), electrically programmable read only memory (EPROM), hard drive, etc.) or microcontrollers executing one or more software or firmware programs or routines, combinational logic circuit(s), input/output circuitry and devices (I/O) and appropriate signal conditioning and buffer circuitry, high speed clock, analog to digital (A/D) and digital to analog (D/A) circuitry and other components to provide the described functionality.

A control module may include a variety of communication interfaces including point-to-point or discrete lines and wired or wireless interfaces to networks including wide and local area networks, on vehicle controller area networks and service-related networks. Functions of a control module as set forth in this disclosure may be performed in a distributed control architecture among several networked control modules.

Software, firmware, programs, instructions, routines, code, algorithms and similar terms mean any control module executable instruction sets including calibrations, data structures, and look-up tables. A control module has a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing engine and vehicle operation. Alternatively, routines may be executed in response to occurrence of an event, software calls, or on demand via user interface inputs or requests.

The ADAS 202 includes a ADAS module 222, also referred to as an ADAS controller 222 or ADAS control module 222, configured to communicate with various systems of vehicle, such as a detection system 228, acceleration system 230, steering system 232, lighting and signaling system 234, navigation system 236, positioning system 238, deceleration system 240, and other systems necessary to partially or fully control the movement, speed, etc. of the vehicle 102. The vehicle 102 may also include a communication system 242 having a circuit configured with Dedicated Short Range Communications protocol (e.g. WiFi) for communication with other vehicles equipped with similar communication systems. These vehicle systems 228-242 may have system specific control modules (not shown) in communications with the ADAS modules 222 for the coordinated control of the vehicle 102 or the ADAS module 222 may function as the control module for directly controlling one or more of the systems 228, 230, 232, 234, 236, 238, 240, 242.

Figure 3:
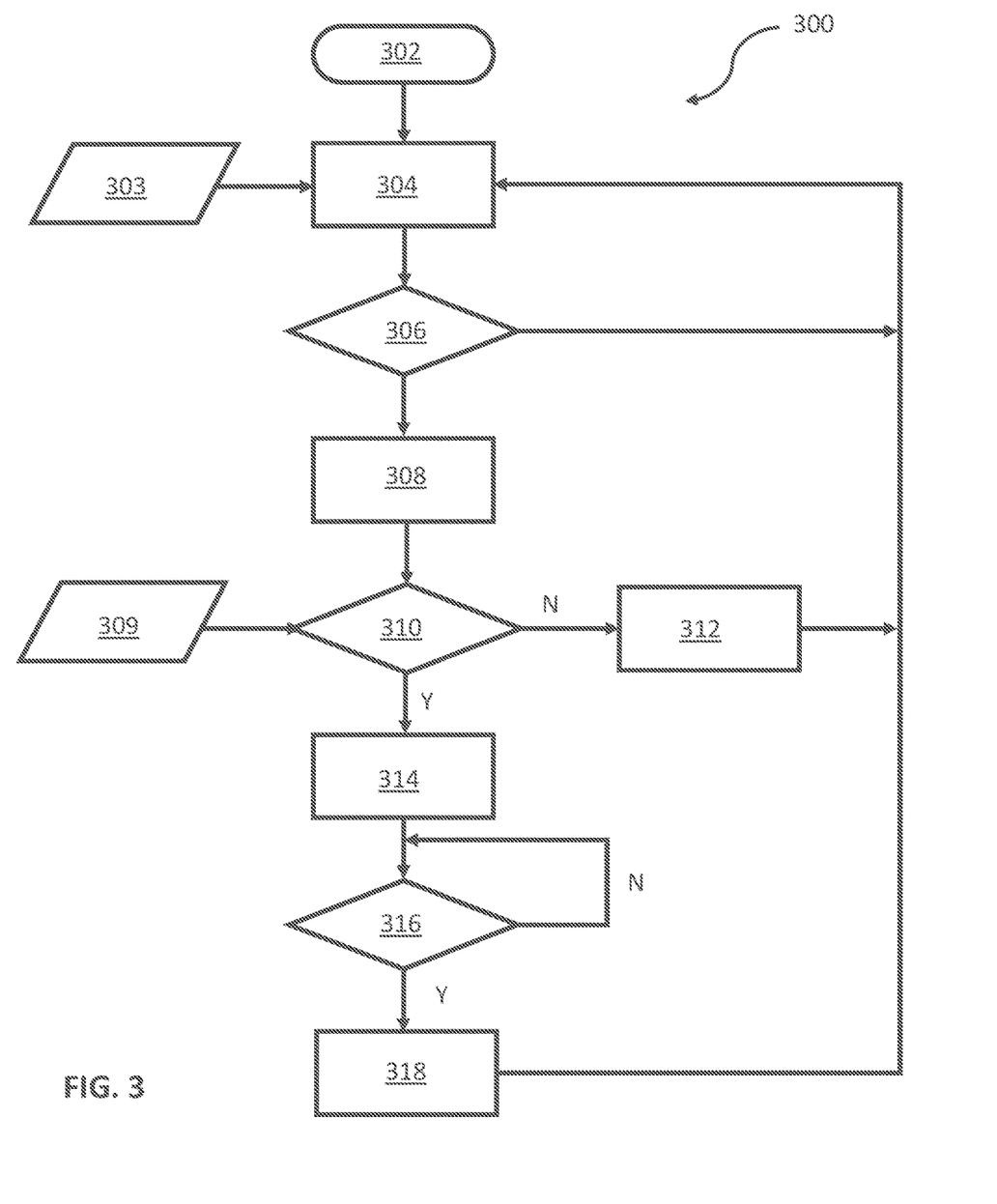
FIG. 3 is a block flow diagram of a method of detecting and mitigating erratic on-road vehicles, according to an exemplary embodiment.

The EVDAM system 204 includes an EVDAM module 224, also referred to as an EVDAM controller 224, configured to communicate with the ADAS module 222, which in turn communicates with the various systems of vehicle to partially or fully autonomously control the vehicle 102. Alternatively, the EVDAM module 224 may communicate directly with the various vehicle systems 228, 230, 232, 234, 236, 238, 240, 242 to partially or fully autonomously control the vehicle 102. The EVDAM module 224 is configured to store and implement a routine for a method of detecting and mitigating erratic vehicles, which is shown in FIG. 3 and described in detail below.

The detection system 228 is in communications with the external sensors 117 including, but not limited to, optical laser devices such as a Light Detection and Ranging (LIDAR) device 252 for having 360 degrees of view about the host vehicle 102, a forward viewing camera 254, a rearward viewing camera 256, sideview cameras 258, 260 and range sensors 262, 264 such as radar and sonar devices. Each of these external sensors 117 may be equipped with localized processing components which process gathered data from these external sensors 117 and provide processed or raw sensor data directly to one or more of the detection system 228, ADAS module 222, and EVDAM module 224.

Communications between the ADAS module 222, EVDAM module 224, vehicle systems 228, 230, 232, 234, 236, 238, 240, 242, and external sensors 117 may be implemented by using a direct wired point-to-point link, a networked communication bus link, a wireless link or another suitable communication link 270. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between vehicle systems and modules.

As an example, by using the communication link 270, the EVDAM module 224 may instruct the ADAS module 222 to interact with the deceleration system 240 and acceleration system 230 in order to control the speed of the host vehicle. Similarly, the EVDAM module 224 may instruct the ADAS module 222 to command the steering system 232, deceleration system 240, and acceleration system 230 to control the direction and movements of vehicle. The signaling system 234 may be used by ADAS module 222 to signal the host vehicle's 102 intent to other drivers or target vehicles, for example, by lighting turn signals, brake lights, or vehicle horn before executing a vehicle maneuver to avoid an erratic vehicle.

FIG. 3 shows a block flow diagram for a method of detecting and mitigating erratic vehicles (method 300). The method 300 may be configured and stored as a routine executable by the EVDAM module 224 of host vehicle 102. The method 300 starts in block 302 when the host vehicle 102 is moving in a forward direction in a partial to full autonomous mode within in a lane on a stretch of roadway.

Moving to block 304, the EVDAM module 224 receives and processes external sensor information gathered by the external sensors from block 303. The EVDAM module 224 processes the external sensor information to detect and identify the roadway, road signs and markers, and the movements of objects including target vehicles. The EVDAM module 224 analyzes the movements of multiple target vehicles within a calibratable sensor region relative to the roadway to determine if a target vehicle is behaving in an erratic manner. Whether a vehicle is behaving in an erratic manner may be determined by a set of conditions, which may include whether the vehicle is detected within the calibratable region and one or more of: (i) oscillating over the centerline of a road lane above a predetermine frequency or driving above a predetermined un-reasonably high offset from the centerline, (ii) fluctuating longitudinal speed relative to the average lane speed of a target vehicle, and (iii) changing lanes above a predetermined frequency.

Moving to block 306, when one or more of the conditions (i), (ii), or (iii) is observed within the calibratable sensor region, the EVDAM may assign a risk score correlating to the observed condition or combination of observed conditions. The EVDAM then executes a mitigating action correlating to the assigned risk score.

As an example, the EVDAM module 224 may utilize the following predetermined conditions below for determining if a target vehicle is behaving erratically. A risk score may then be assigned based the observed condition or combination of observed conditions. The predetermined conditions are classified as Condition A, Condition B, Condition C, and Condition D. A target vehicle is determined to be an erratic vehicle when Condition A is True and one or more of Conditions B, C, and D is True.

Condition A=True when $[K_{thrsh0}>=ABS(\Delta X_{tgt})>=K_{thrsh1}]$
Condition B=True when $\{ABS(\Delta y_{tgt})>\times K_{thrsh2}$ AND $freq_{tgt,lane,cntr}>=K_{thrsh3}\}$
Condition C=True when $Std(v_{tgt}-v_{lane,avg})>=K_{thrsh4}$
Condition D=True when $\Delta t_{tgt,btwn,LaneChange}<=K_{thrsh5}]$
where:
$\Delta x_{tgt}$=Longitudinal distance to the target vehicle;
$\Delta y_{tgt}$=Lateral distance of the centerline of the target vehicle from the centerline of the lane;
$v_{tgt}$=Target vehicle's longitudinal speed;
$v_{lane,avg}$=Target vehicle average lane speed;
$freq_{tgt,lane,cntr}$=Detected frequency of the centerline of the target vehicle crosses over the centerline of the lane;
$\Delta t_{tgt,btwn,LaneChange}$=Detected elapsed time period between lane change of the target vehicle;
$K_{thrsh0}$=Minimal effective external sensor range that is a calibratable threshold (distance) as functions of host vehicle velocity;
$K_{thrsh1}$=Maximum effective external sensor range that is a calibratable threshold (distance) as functions of host vehicle velocity;
$K_{thrsh2}$=P redetermined calibratable threshold (distance) of the centerline of the target vehicle from the centerline of the lane;
$K_{thrsh3}$=P redetermined frequency of the target vehicle is moving over the middle of the lane;
$K_{thrsh4}$=P redetermined threshold of the target vehicle's velocity variance; and
$K_{thrsh5}$=P redetermined threshold time between the target vehicle's lane changes.

Conditions A is true when the target vehicle is detected between the inner sensor range 110*a* and the outer sensor range of the external sensors 117 as shown in FIG. 1. The inner sensor range 110*a* and the outer sensor range 110*b* are calibrate with respect to the velocity of the host vehicle 102 and environmental conditions such that the confidence of data gathered by the external sensors 117 within the calibrated sensor region 110 is above a predetermine confidence level, such as 99.5%, and provides sufficient time for the EVDAM system to process the data collected by the external sensors 117 in order to detect and react to an erratic vehicle.

Condition B is true when the centerline of the target vehicle oscillates over the centerline of the roadway beyond a predetermined lateral distance, for example 50 cm, and over above a predetermined frequency, such as 0.5 hz.

Condition C is true when the standard deviation in the fluctuation in speed of the target vehicle is above a predetermined velocity variance.

Condition D is true when the time period between lane changes of the target vehicle is less than a predetermined time period.

The follow is an example of a Scoring System in arithmetic summation for assigning a risk score (K %) to the target vehicle based on an observed condition and combinations of observed conditions:

If Condition (A) AND Condition (C)=True, then assign a risk score=25%;
If Condition (A) AND Condition (D)=True, then assign a risk score=25%; If Condition A AND Condition B=True, then assign a risk score=40%;
If Condition (A) AND {Condition (C) AND Condition (D)}=True, then assign a risk score=75%;
If Condition (A) AND {Condition (B) AND Condition (C)}=True, then assign a risk score=80%;
If Condition (A) AND {Condition (B) AND Condition (C)}=True, then assign a risk score=90%;
If Condition (A) AND {Condition (B) AND Condition (C) AND Condition (D)}=True, then assign a risk score=100%.

When the assigned risk score is equal to or greater than a predetermined minimal risk score K %, which in the above example is 25%, then the EVDAM module 224 implement a predetermined mitigating action correlating to the assigned risk score. The predetermined mitigating action correlating to an assign risk score may be stored as a look-up table in the EVDAM module 224.

Moving to block 308, if the risk score is relatively low, for example 25%, the mitigating action may include the EVDAM module 224 communicating with the ADAS module 222 to initiate a tactile, visual, or audible warning to the operator. An example of a tactile warning may include vibrating a feature that is normally in contact with the operator such as the steering wheel or operator seat. An example of the visual warning may include a visual indicator such as a light on a dash, a human machine interface such as the infotainment system, or onboard display. An example of an audible warning may be the sounding of the horn in short and/or long bursts or providing an audible warning over the internal speakers of the infotainment system.

Moving to block 310, if the risk score is relatively high, for example 90%, the mitigating action may include the EVDAM module 224 initiating a speed change or maneuver to distance the host vehicle from the erratic vehicle. The mitigating action may include the EVDAM module 224 receiving information on the host vehicle speed set by the operator or ADAS system, also known as a set speed; the maximum posted speed limit from the detection system, navigation system, or other sources; and the host vehicle position relative to the erratic vehicle. If the position of the host vehicle is in the same lane as the erratic vehicle and behind the erratic vehicle, then the EVDAM module 224 may (a) calculate a safe overtake speed (K1) and a pathway sufficient to overtake the erratic vehicle, (b) decelerate to increase the distance from the erratic vehicle, or (c) change lanes to a lane further from the erratic vehicle. If the operator or ADAS module 222 set vehicle speed plus the calculated overtake speed (K1) is less than or equal to the maximum posted speed limit, then the method moves to block 314.

In block 314, the EVDAM module 224 coordinates with the ADAS module 222 to evaluate the surrounding region to determine if overtaking (i.e. passing) the erratic vehicle is safe. When overtaking is safe, the ADAS module 222 communicates with selected vehicle systems to activate the host vehicle external signals and notify the operator that the host vehicle 102 is preparing to implement a lane change overtaking routine by maneuvering to a lane left of the erratic vehicle and increases speed to overtake the erratic vehicle. The host vehicle 102 overtakes the erratic vehicle and the method then moves to block 316.

In block 316, the EVDAM module 224 determines if it is safe for overtaking return, meaning if it is safe for the host vehicle to merge back to the original lane to complete the overtake of the erratic vehicle. Once the erratic vehicle is far enough not to influence the host vehicle's safety and it is safe to return to the original lane, the method moves to block 318 where command automated lane change overtaking return routine is implemented, and the method returns to block 304 and continues.

Referring back to block 310, if the host vehicle 102 set speed plus the calculated safe overtake speed (K1) is greater than the maximum posted speed, then the method 300 moves to block 312. In block 312 the ADAS module 222 reduces the speed of the host vehicle to increase a safe distance from the erratic vehicle or changes to a further lane to increase the distance between the host vehicle and the erratic vehicle. The method then returns to block 304.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

The invention claimed is:

1. A method of detecting and mitigating an erratic vehicle by a host vehicle, comprising:
   gathering external sensor information on an external region surrounding the host vehicle;
   analyzing the external sensor information to detect a target vehicle traveling in a lane and a movement of the target vehicle in the lane;
   determining whether the movement of the target vehicle in the lane meets at least one predetermined condition for being the erratic vehicle;
   assigning a risk score to the target vehicle when the movement of the target meets the at least one predetermined condition for being the erratic vehicle; and
   implementing a predetermined mitigating action correlating to the assigned risk score to the target vehicle;
   wherein the predetermined mitigating action includes at least one of: warning an operator of the host vehicle, warning a vehicle proximal to the host vehicle, and taking at least partial control of the host vehicle to further increase a distance between the host vehicle and the target vehicle; and
   wherein determining whether the movement of the target vehicle in the lane meets the at least one predetermined condition for being the erratic vehicle includes:
      analyzing the external sensor information to determine a target vehicle centerline and a lane centerline; and
      determining a frequency of oscillation when the target vehicle centerline oscillates over the lane centerline above a predetermined lateral off-set distance; and
   wherein the at least one predetermined condition includes the frequency of oscillation is above a predetermined frequency.

2. The method of claim 1, wherein the predetermined mitigating action is taking at least partial control of the host vehicle to further increase the distance between the host vehicle and the target vehicle.

3. The method of claim 2, wherein taking at least partial control of the host vehicle to further increase the distance between the host vehicle and the target vehicle, includes:
   determining whether the target vehicle is in the same lane as the host vehicle and whether target vehicle is in front of the host vehicle;
   determining a set speed of the host vehicle and a maximum posted speed limit, when the target vehicle is determined to be in the same lane as the host vehicle and in front of the host vehicle;
   calculating an overtaking speed to pass the target vehicle; and
   initiating one of: (i) a lane change overtaking routine when a sum of the set speed of the host vehicle and the calculated overtaking speed is less than the maximum posted speed limit, (ii) a deceleration routine when the sum of the set speed of the host vehicle and the calculated overtaking speed is equal to or greater than the maximum posted speed limit, and (iii) a lane change routine to maneuver the host vehicle to a lane further distance from the lane of the target vehicle when the sum of the set speed of the host vehicle and the calculated overtaking speed is equal to or greater than the maximum posted speed limit.

4. The method of claim 1, wherein determining whether the movement of the target vehicle in the lane meets at the least one predetermined condition for being the erratic vehicle includes:

determining a length of time when the target vehicle centerline is continuously off-set from the lane centerline for greater than the predetermined lateral off-set distance; and wherein the at least one predetermined condition includes the determined length of time is greater than a predetermined length of time.

5. The method of claim 1, wherein determining whether the movement of the target vehicle in the lane meets at the least one predetermined condition for being the erratic vehicle includes:

analyzing the external sensor information to detect a fluctuation in speed of the target vehicle and an average lane speed of the target vehicle; and calculating a standard deviation of the fluctuation in speed of the target vehicle relative to the average lane speed of the target vehicle; and wherein the at least one predetermined condition includes the calculated standard deviation of the fluctuation in speed of the target vehicle relative to the average lane speed of the target vehicle is above a predetermined standard deviation.

6. The method of claim 1, wherein determining whether the movement of the target vehicle in the lane meets at the least one predetermined condition for being the erratic vehicle includes:

analyzing the sensor information to detect a frequency of lane changes by the target vehicle; and wherein the at least one predetermined condition includes the detected frequency of lane changes is above a predetermined frequency of lane change.

7. The method of claim 1, wherein determining whether the movement of the target vehicle in the lane meets at the least one predetermined condition for being the erratic vehicle includes:

determining whether a Condition A is True and at least one of: a Condition B, a Condition C, and a Condition D is True, wherein:

the Condition A=True when $[K_{thrsh0}>=ABS(\Delta X_{tgt})>=K_{thrsh1}]$ the Condition B=True when $\{ABS(\Delta_{ytgt})>=K_{thrsh2}$ AND $freq_{tgt,lane,cntr}>=K_{thrsh3}\}$ the Condition C=True when $Std(_{vtgt-vlane,avg})>=K_{thrsh4}$ the Condition D=True when $\Delta t_{tgt,btwn,LaneChange}<=K_{thrsh5}]$ wherein:

$\Delta_{xtgt}$=Longitudinal distance to the target vehicle;

$\Delta_{ytgt}$=Lateral distance of a center line of the target vehicle from a centerline of the lane;

$v_{tgt}$=Target vehicle longitudinal speed;

$v_{lane,avg}$=Target vehicle average lane speed;

$freq_{tgt,lane,cntr}$=Detected frequency of the centerline of the target vehicle crosses over the centerline of the lane;

$\Delta t_{tgt,btwn,LaneChange}$=Detected elapsed time period between lane change of the target vehicle;

$K_{thrsh0}$=Minimal effective external sensor range that is a calibratable threshold (distance) as functions of host vehicle velocity;

$K_{thrsh1}$=Maximum effective external sensor range that is a calibratable threshold (distance) as functions of host vehicle velocity;

$K_{thrsh2}$=Predetermined calibratable threshold (distance) of the centerline of the target vehicle from the centerline of the lane;

$K_{thrsh3}$=Predetermined frequency of the target vehicle is moving over the centerline of the lane;

$K_{thrsh4}$=Predetermined threshold of the target vehicle velocity variance; and $K_{thrsh5}$=Predetermined threshold time between the target vehicle lane changes.

8. The method of claim 7, wherein assigning a risk score to the target vehicle when the movement of the target meets the at least one predetermined condition for being the erratic vehicle, includes:

assigning a first risk score when the Condition A and [the Condition C or the Condition D] are True;

assigning a second risk score when the Condition A and the Condition B are True;

assigning a third risk score when the Condition A and [the Condition C and the Condition D] are true;

assigning a fourth risk score when the Condition A and [the Condition B and the Condition C] are True;

assigning a fifth risk score when the Condition A and [the Condition B, the Condition C, and the Condition D] are True; and wherein a risk of adverse reaction to the host vehicle increases as the risk score increases from the first risk score to the fifth risk score.

9. The method of claim 8, wherein a scope of the predetermined mitigating action correlate with the assigned risk score, such that the first risk score includes a warning to an operator of the host vehicle and the third risk score to fifth risk score includes a partial to a full autonomous mitigating action.

10. An autonomous vehicle comprising:

at least one external sensor configured to collect sensor information on an external region surrounding the autonomous vehicle; and a module configured to:

analyzing the sensor information to detect a target vehicle in a lane, a movement of the target vehicle in the lane, and a relative position of the target vehicle with respect to the autonomous vehicle;

determining the target vehicle is an erratic vehicle when the movement of the target vehicle includes at least one of: (i) oscillating over a centerline of the lane above a predetermine frequency, (ii) driving beyond a predetermined lateral offset from the centerline of the lane for greater than a predetermined length of time, (iii) fluctuating in speed relative to an average speed above a predetermined standard deviation, and (iv) changing lanes beyond a predetermined frequency; and implementing a mitigating action including taking at least partial control of the autonomous vehicle to further distance the autonomous vehicle apart from the erratic vehicle;

wherein taking at least partial control of the autonomous vehicle to further distance the autonomous vehicle apart from the erratic vehicle, includes:

determining the relative position of the erratic vehicle to be in front of the autonomous vehicle;

determining a current speed of the autonomous vehicle and a maximum posted speed limit;

calculating an overtaking speed to pass the erratic vehicle; and initiating a lane change overtaking routine when a sum of the current speed of the autonomous vehicle and the calculated overtaking speed is less than the maximum posted speed limit.

11. The vehicle of claim 10, wherein taking at least partial control of the autonomous vehicle to further distance the autonomous vehicle apart from the erratic vehicle, includes:

decelerating the autonomous vehicle when the sum of the current speed of the autonomous vehicle and the calculated overtaking speed is equal to or greater than the maximum posted speed limit.

12. The vehicle of claim 11, further includes implementing the mitigating action when [$K_{thrsh0}$>=ABS ($\Delta X_{tgt}$)>=$K_{thrsh1}$] is true, wherein:

$\Delta_{xtgt}$=Longitudinal distance to the target vehicle;

$K_{thrsh0}$=Minimal effective external sensor range that is a calibratable threshold (distance) as functions of autonomous vehicle velocity; and $K_{thrsh1}$=Maximum effective external sensor range that is a calibratable threshold (distance) as functions of autonomous vehicle velocity.

13. The vehicle of claim 12, further includes implementing the mitigating action when one or more the following is true:

{ABS($\Delta y_{tgt}$)>=$K_{thrsh2}$ AND freq$_{tgt,lane,cntr}$>=$K_{thrsh3}$};

Std($v_{tgt}$-$v_{lane,avg}$)>=$K_{thrsh4}$; and $\Delta t_{tgt,btwn,LaneChange}$<=$K_{thrsh5}$ ];

wherein:

$\Delta y_{tgt}$=Lateral distance of the centerline of the target vehicle from the centerline of the lane;

$v_{tgt}$=Target vehicle longitudinal speed;

$v_{lane,avg}$=Target vehicle average lane speed;

freq$_{tgt,lane,cntr}$=Detected frequency of the centerline of the target vehicle crosses over the centerline of the lane;

$\Delta t_{tgt,btwn,LaneChange}$=Detected elapsed time period between lane change of the target vehicle;

$K_{thrsh2}$=Predetermined calibratable threshold (distance) of the centerline of the target vehicle from the centerline of the lane;

$K_{thrsh3}$=Predetermined frequency of the target vehicle is moving over the middle of the lane;

$K_{thrsh4}$=Predetermined threshold of the target vehicle velocity variance; and $K_{thrsh5}$=Predetermined threshold time between the target vehicle lane changes.

14. An erratic vehicle detection and mitigation (EVDAM) system for a host vehicle, comprising:

at least one external sensor configured to collect sensor information on a calibratable sensor region surrounding the host vehicle; and a module configured to:

process the sensor information from the at least one external sensor to detect: (i) the erratic vehicle within the calibratable sensor region surrounding the host vehicle and (ii) a position of the erratic vehicle relative to the host vehicle, and implement a mitigating action including increasing a distance of the host vehicle form the erratic vehicle;

wherein the mitigating action includes:

determining the host vehicle is in a same lane behind the erratic vehicle;

determining a current speed of the host vehicle and a maximum posted speed limit;

calculating an overtaking speed to pass a target vehicle; and including at least one of: (i) initiating a lane change overtaking routine when a sum of the current speed of the host vehicle and the calculated overtaking speed is less than the maximum posted speed limit, (ii) decelerating the host vehicle when the sum of the current speed of the host vehicle and the calculated overtaking speed is equal to or greater than the maximum posted speed limit, and (iii) changing lanes when the sum of the current speed of the host vehicle and the calculated overtaking speed is equal to or greater than the maximum posted speed limit;

wherein the calibratable region surrounding the host vehicle is defined between an inner sensor range and an outer sensor range, and wherein the inner sensor range and the outer sensor range are calibrated with respect to a velocity of the host vehicle and detected environmental conditions, such that a confidence level of information gathered by external sensor is above a predetermine confidence level and provides sufficient time for the module to process the external sensor information in order to detect and mitigate the erratic vehicle.

15. The EVDAM system of claim 14, wherein the module is configured to communicate with at least one vehicle system for an autonomous operation of the host vehicle to implement the mitigating action.

* * * * *